United States Patent [19]

Levine et al.

[11] Patent Number: 4,669,654
[45] Date of Patent: Jun. 2, 1987

[54] ELECTRONIC PROGRAMMABLE THERMOSTAT

[75] Inventors: Michael R. Levine; James T. Russo; Victor H. Rigotti, all of Ann Arbor, Mich.

[73] Assignee: Honeywell, Inc., Minneapolis, Minn.

[21] Appl. No.: 830,229

[22] Filed: Feb. 18, 1986

[51] Int. Cl.⁴ .............................................. F23N 5/20
[52] U.S. Cl. .................................... 236/46 R; 165/12
[58] Field of Search ......................... 236/46 R, 78 D; 165/12 R, 2 G; 364/557, 505; 374/170

[56] References Cited

U.S. PATENT DOCUMENTS

| | | | |
|---|---|---|---|
| 3,499,483 | 3/1970 | Schrader | 165/2 G |
| 3,942,718 | 3/1976 | Palmieri | 236/78 R |
| 4,150,718 | 4/1979 | Kolbow et al. | 165/2 G |
| 4,288,854 | 9/1981 | Burroughs | 236/46 R |

Primary Examiner—William E. Wayner
Attorney, Agent, or Firm—Krass & Young

[57] ABSTRACT

An electronic programmable thermostat for the control of a furnace or air conditioner is useful as a replacement for a conventional non-programmable thermostat and mounts on the non-programmable thermostat's wall plate to achieve support, electrical connection with the load and power supply, and the use of certain manual controls supported on the wall plate. The programmable thermostat employs a circular printed circuit board supporting its electronic components, which include a potentiometer for operator adjustment of desired temperature. A flat circular knob supported on the potentiometer shaft and an annular bezel cover the thermostat and allow access to the manual controls supported on the wall plate. The potentiometer and a temperature sensing thermistor control the frequency of a pulse generator which provides input to a counter. The resulting digital signal is compared with a digital signal generated under control of a clock and manually actuable programming switches, to generate an output control signal for the load.

11 Claims, 4 Drawing Figures

ELECTRONIC PROGRAMMABLE THERMOSTAT

FIELD OF THE INVENTION

This invention relates to programmable thermostats for the control of furnaces or the like and more particularly to a microprocessor based thermostat having a rotary analog control device for operator adjustment of desired temperature.

PRIOR ART

Conventional thermostats for the control of furnaces or air conditioners, (loads) of the type used in homes and commercial establishments, allow the user to set in a single desired temperature or set-point. The thermostat includes a mechanism, such as a mercury switch supported on a spirally wound bi-metal strip, which causes electrical power to be applied to a temperature modifying load to bring the ambient temperature into accord with the set-point temperature. One of the more commercially popular forms of such thermostats employs a circular plate adapted to be mounted on a wall and having terminals that connect to wires extending from the load and power supply. The wall plate may support certain manual controls such as a heating/air conditioning switch mounted on its perimeter, and has three threaded fasteners fixed on its central-section which allow a thermostat mechanism to be attached and electrically connected to the load and power supply. The thermostat adapted to be mounted on the plate has a convexly rounded, circular configuration including a knob that may be rotated to set in the desired temperature set-point. A thermostat of this type is disclosed in U.S. Pat. No. 2,729,719.

In recent years the rising cost of energy has given rise to the use of clock or programmable thermostats which automatically decrease or set back the temperature set-point during those hours of the day that the building is normally unoccupied or the occupants are sleeping. To simplify the substitution of such a clock thermostat for a conventional, unprogrammable thermostat of the type previously described, and particularly to avoid the need to remove the existing wall plate, it has been suggested that an adaptor plate be secured to the wall plate of the conventional thermostat, and the clock thermostat attached to the adaptor plate. U.S. Pat. No. 4,150,718 discloses a conversion apparatus of this type.

The development of microprocessors and their rapid decrease in cost has lead to a class of electronic programmable thermostats using microprocessors as a controller. These devices are capable of implementing relatively complex modes of control, such as the provision of different temperature schedules for different days of the week and adaptive techniques that adjust cycle time or the load turn-on time to achieve a desired temperature at a desired time. Thermostats of this type are disclosed in U.S. Pat. Nos. 4,335,847 and 4,356,962.

It would be desirable to provide an electronic thermostat, based on a microprocessor, having a configuration which would allow it to replace conventional round thermostats of the type described above, and would use the wall plate of the conventional thermostat for mounting, eliminating the need for replacement of the existing wall plate or disturbance of the existing wiring.

SUMMARY OF THE PRESENT INVENTION

The present invention is directed toward an electronic programmable thermostat, based on a microprocessor, which emulates the basic control function of conventional round thermostats by allowing the desired temperature to be adjusted by rotation of a member supported on the thermostat and is adapted to serve as a replacement for a conventional round thermostat using the wall plate of the replaced thermostat for support and connection purposes.

A preferred embodiment of the thermostat of the present invention, which will subsequently be described in detail, employs a flat printed circuit board of circular configuration to support the microprocessor and all of its associated electronic components. These components include a potentiometer mounted on the center of the board with its shaft projecting normally to the plane of the board. A relative large circular knob, generally flat in configuration, is fixed to the shaft so that the knob extends parallel to the printed circuit board and covers the central portion of its surface. An annular plastic cover has a cylindrical skirt operative to surround the sides of the printed circuit board and a rounded, inwardly curved forward section formed with a central aperture that surrounds the potentiometer knob. The rear side of the skirt carries a pair of clips that join to opposed edges of the printed circuit board to secure the cover to the board in a non-rotating manner. Cooperating indicia formed on the perimeter of the knob and the edge of the central aperture in the cover allow the knob to be rotated to indicate a desired set-point temperature. These indicia may constitute numbers or other symbols representing temperatures or relative temperature change.

The printed circuit board is preferably connected directly to the wall plate of the conventional thermostat being replaced by threaded fasteners that pass through holes in the printed circuit board and are secured in threaded nuts formed in the wall plate. These fasteners make electrical connection between the replacement thermostat and the load and power supply as well as mechanically supporting the replacement thermostat on the wall plate. The fasteners space the rear edge of the cover skirt from the wall plate a sufficient distance to allow access to the perimeter manual controls formed on the wall plate.

The electronic circuitry of the replacement thermostat is largely implemented by a suitably programmed microprocessor. It includes a variable frequency generator connected to the potentiometer and to a thermistor having a resistance dependent upon ambient temperature. The frequency of the generator is thus dependent on the sum of the resistances of the thermistor and potentiometer. A counter implemented by the microprocessor receives the output of the variable frequency generator to provide a digitized signal representative of the sum of the resistances. A comparator accepts the digital signal and the output of a read-only memory to generate an energizing control signal for a solid state switch connected to the load and power supply.

When the potentiometer is set to a high resistance, the microprocessor controls the temperature modifying load to cause the ambient temperature to reach a high temperature which causes a low resistance value in the thermistor. When the potentiometer is set to a low resistance, the microprocessor controls the temperature modifying load to cause the ambient temperature to reach a low temperature which causes a high resistance value in the thermistor. Essentially the microprocessor controls the output switch of the thermostat to maintain the combined resistance at a constant value.

Previous thermostats, such as the commercial version of the thermostat disclosed in Levine U.S. Pat. No. 4,206,872, have utilized thermistors to sense ambient temperature and have provided trimming potentiometers connected to the thermistors for calibration purposes. The operator entered a desired set-point into the thermostat through a digital circuit. In the system of the present invention the potentiometer itself is used to enter desired set-point. Accordingly the knob of the potentiometer is provided with suitable indicia to guide the operator in the adjustment of the set-point.

The constant value which the microprocessor seeks to maintain is a function of a system clock and manually adjustable switches that input a desired schedule of set-back times over a daily period. A manually actuable push-button can be used to synchronize these schedules to the user's schedule, to initialize the operation of the thermostat and to input signals that allow set-back programs to be deleted for particular days of the week.

An important aspect of the invention is the use of a rotary knob, controlling an analog potentiometer, to provide the microprocessor with signals representative of the normal temperature adjustment by the operator. This allows the present thermostat to emulate the familiar mode of operation of conventional thermostats, simplifying the learning process required to achieve the attendant improvement of operating controls.

While the thermostat of the present invention is intended to be useful as a replacement for a conventional thermostat, it should be recognized that it can be marketed with its own wall plate, allowing it to be useful as an original installation thermostat as well as a replacement thermostat.

DETAILED DESCRIPTION OF THE DRAWINGS

Other advantages and applications of the present invention will be made apparent by the following detailed description of a preferred embodiment of the invention. The description makes reference to the accompanying drawings in which.

The thermostat of the present invention, generally indicated at 10, preferably employs a base, or wall plate, generally indicated at 12, which is circular in configuration and is adapted to be mounted on a wall by means of a pair of screws 14 and 16, which pass through slots 18 and 20 formed in the wall plate 12. Alternatively, an appropriate adhesive or tape (not shown) may be used to hold the plate 12 to the wall.

Figure 3:
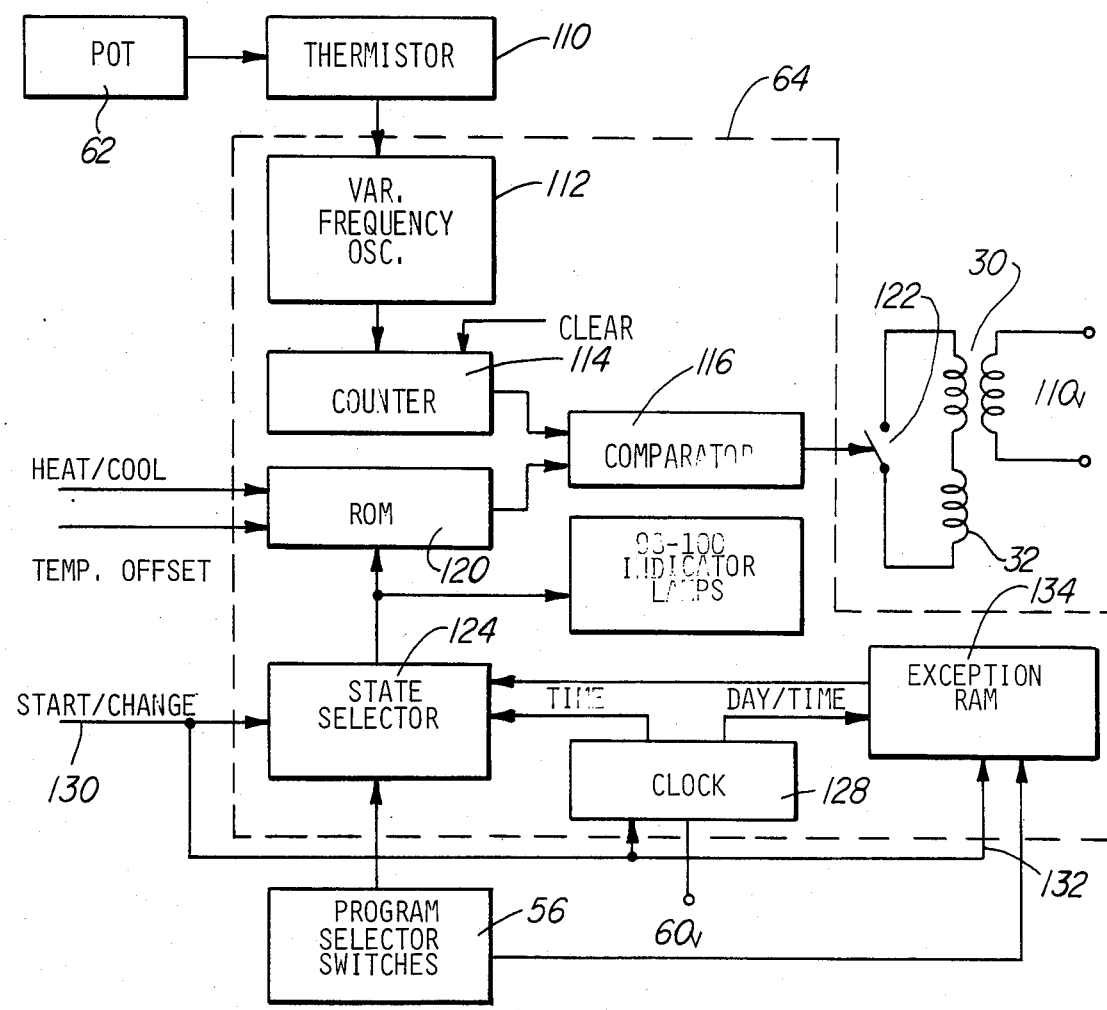
FIG. 3 is a representational block diagram of the circuitry of the present invention, illustrating the manner of operation of the microprocessor.

Screw terminals 22, 24, and 26 supported on the wall plate 12 are adapted to receive wires 28, that are pulled through the wall and connect to a power supply, such as the secondary of a transformer, schematically illustrated at 30, in FIG. 3, and to a temperature modifying load, such as a coil of a furnace relay, 32, illustrated schematically in FIG. 3.

The three terminals 22, 24 and 26 make appropriate connections (through conductors formed on the rear side of the wall plate, not shown) to a HEAT/COOL switch 34 which selects two of the three terminals for connection to three internally threaded cylindrical connectors and spacers 38, 40 and 42 which project outwardly from the front surface of the wall plate 12.

Depending upon the requirements of the space controlling system anywhere from 2 to 6 wires may interconnect the remote power supply and temperature modifying loads to the wall plate 12. Some of these wires are controlled solely by switches disposed on the wall plate, such as the FAN ON/AUTOMATIC switch 36 and do not electrically interconnect with the thermostat of the present invention.

The wall plate 12 is of the type employed with conventional thermostats such as the ones illustrated in U.S. Pat. No. 2,729,719 and U.S. Pat. No. Re. 28,676. Other forms of wall plates or bases that may be used with the thermostat of the present invention, and are also adaptable for use with conventional thermostats, are the type illustrated in U.S. Pat. No. 4,150,718.

The electronic circuitry of the programmable set-back thermostat of the present invention is supported on a printed circuit board 50 which is generally planar, and substantially round and preferably has a diameter no greater than the diameter of the wall plate 12. The electronic components of the thermostat include various resistors 52, a capacitor 54, four thumb switches 56, a three position slide switch 58, a push-button switch 60, a potentiometer 62, and a integrated circuit microprocessor chip 64. These components and the others on the board are all electrically interconnected by electrical conductors formed on the rear of the board 50 (not shown).

The printed circuit board 50 is attached to the wall plate 12, and electrically interconnected with the temperature modifying load, the power supply, and the switches 34 and 36, by three screws 66, 68 and 70 which pass through conductive eyelets 72, 74 and 76 respectively, formed through circuit board 50, and thread into the spacers and conductors 38, 40 and 42 respectively formed on the wall plate 12. When secured, the screws retain the circuit board in spaced parallel relation to the wall plate 12 and provide the necessary electrical connections.

The potentiometer 62 is supported on the center of the circuit board 50 with its shaft 78 projecting outwardly and in a direction opposite to the wall plate 12. A circular, generally flat control knob 80 is adapted to be secured on the end of the shaft 78. The knob 80 has peripheral markings 82 which allow appropriate adjustment of the potentiometer 62.

Figure 1:
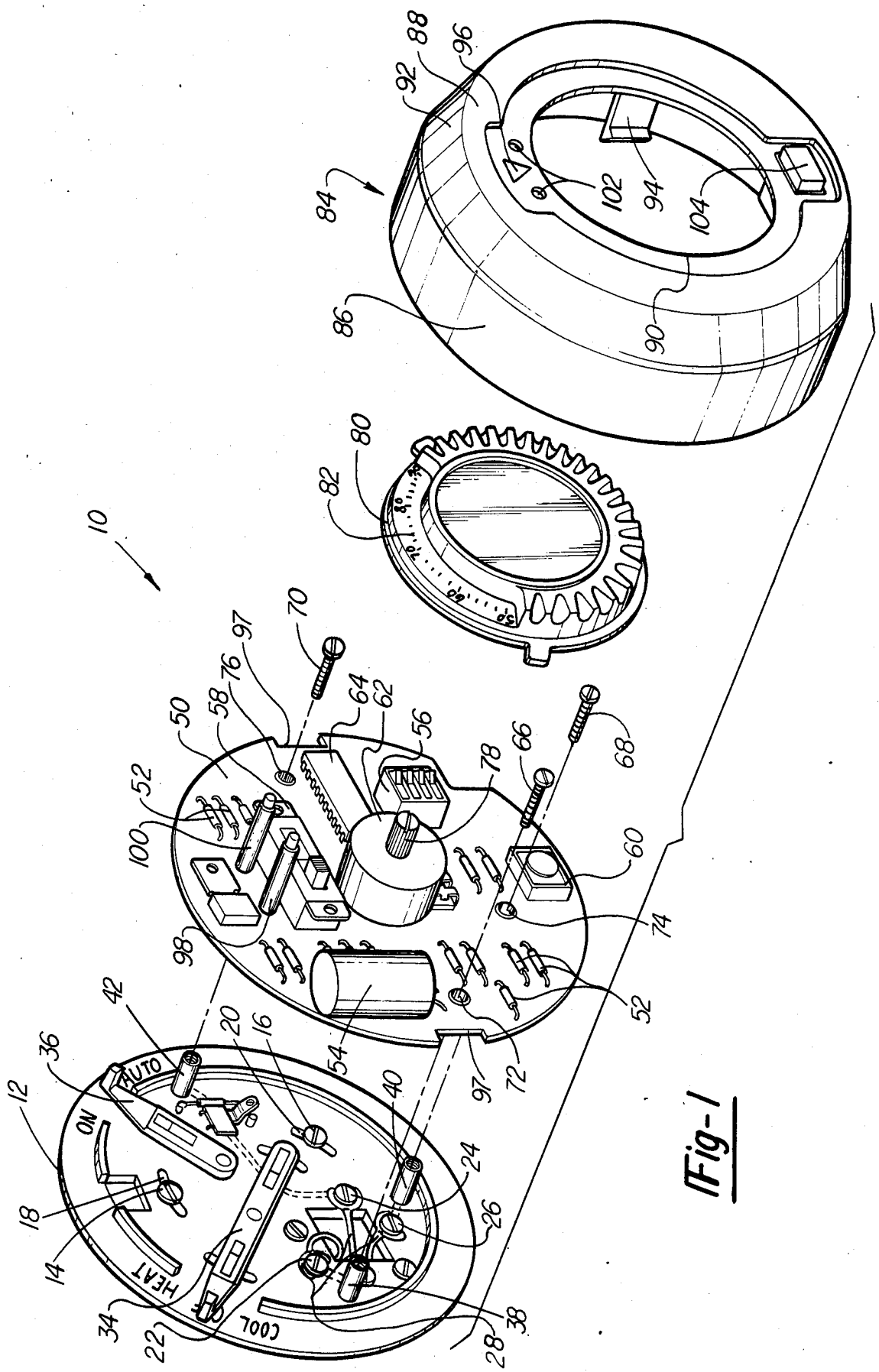
FIG. 1 is a perspective, exploded view of a thermostat of the present invention and a typical wall plate.

A thin-walled cover member, generally indicated at 84, and preferably formed of molded plastic, has a cylindrical rearwardly extending skirt 86, with an inner diameter slightly greater than the outer diameter of the circuit board 50. The cover 84 has a forward section 88, extending normally to the skirt 86 and terminating in a central aperture 90 with a diameter substantially equal to the outer diameter of the knob 80. A beveled section 92 joins the forward end of the skirt to the outer diameter of the forward section 88 so that the entire surface has a convex configuration. A pair of resilient clips 94, only one of which is shown in FIG. 1, extend rearwardly from diametrically opposite sides of the interior side of the forward section along the inner sides of the skirt and are adapted to snap over notches 97 formed in opposed sides of the printed circuit board 50, to secure the cover 84 to the circuit board 50 in non-rotating relation.

Figure 2:
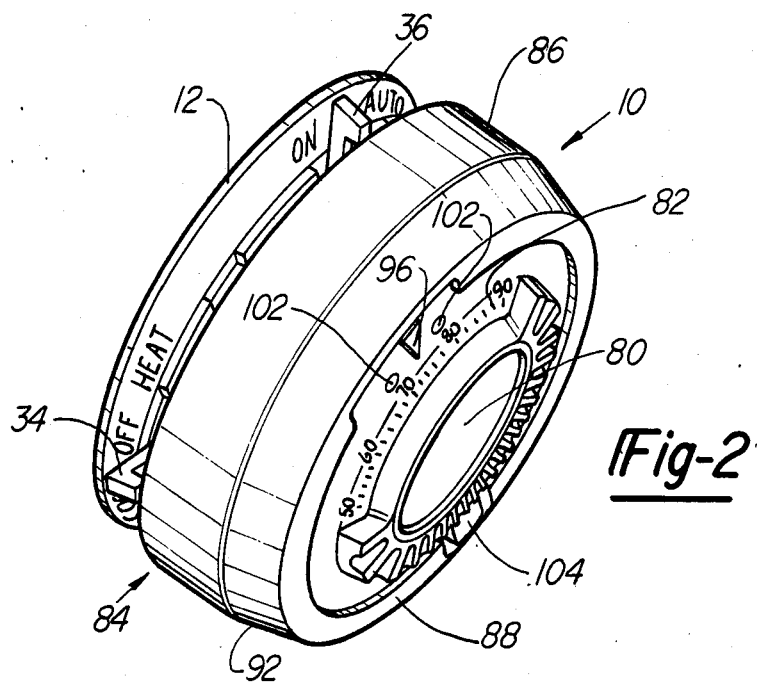
FIG. 2 is a perspective view of the thermostat of the present invention assembled to its wall plate.

FIG. 2 illustrates the completed thermostat assembly with the printed circuit board 50 secured to the wall plate 12 by the screws 66, 68 and 70, knob 80 secured to the shaft 78 of the potentiometer, and the cover 84 snapped to the printed circuit board. In this assembled mode the printed circuit board 50 is sufficiently spaced from the wall plate to allow access to the switches 34 and 36 formed on the perimeter of the wall plate.

A marker 96 is formed on the forward section 88 of the cover 84 and cooperates with the indicia 82 formed at the knob, to allow temperature adjustment through potentiometer 62.

A pair of indicator lights, 98 and 100, project from the surface of the printed circuit board 50 and are visible through holes 102 formed in the front of the cover 84. A push-button 104 is also supported in the front side of the cover 84 and cooperates with the push-button 60 formed on the printed circuit board 50 to allow the manual input of information in a manner which will subsequently described.

Turning to the electronic circuitry of the present programmable, set-back thermostat, most of the control functions are performed by the microprocessor 64. In FIG. 3, the microprocessor is designated by a dotted line enclosing a number of blocks which represent functions performed by the microprocessor. In alternative embodiments of the invention the microprocessor or certain of the functions it performs could be implemented by discrete circuits and components.

The potentiometer 62 is electrically connected to a thermistor 110 which has a resistance proportional to the ambient temperature on the thermostat. The thermistor 110 is preferably located at a point on the printed circuit board 50 which is sufficiently removed from the other components which dissipate heat when in operation so that the thermistor measures the true ambient temperature at the thermostat, independent of the temperature of the other components. The thermistor is preferably located near the lower side of the printed circuit board so that convection currents generated by the power dissipation of the other components do not affect its ambient temperature.

The potentiometer 62 and the thermistor 110 are connected in series as the resistive element of a variable frequency oscillator 112 implemented within the microprocessor 64; that is, the microprocessor generates an internal signal having a frequency proportional to the sum of the resistances. The repetitive output of the oscillator 112 is provided to a counter 114, also implemented within the microprocessor. At regular intervals, the counter is cleared and its output, a digital number which is a function of both the setting of the potentiometer 62 and the temperature of thermistor 110, is provided to a comparator 116 implemented within the microprocessor. The other input to the comparator 116 is generated by a read-only memory 120, forming part of the microprocessor chip.

The comparator essentially determines whether the output of the counter 114 is greater than or less than the output of the read-only memory 120, and acts to control a switch 122, which represents the output of the thermostat. The switch is connected to the power supply 30 and the load 32 to control the energization of the load so as to restore the ambient temperature at the thermostat, as measured by the thermistor 110 to either the temperature set in to the thermostat by an operator through rotation of a dial 80, or a set-back temperature, which is lower than the set temperature when the thermostat is in the heating mode or higher than the set temperature when the thermostat is in the cooling mode.

For purposes of simplification, only a two wire circuit, controlling a single temperature modifying load 32, is illustrated in FIG. 3. For the control of both heating and cooling, the HEAT/COOL switch selects which load is connected to the electronic circuitry.

The digital value that is generated by the read-only memory 120 is dependent on three inputs to that circuit: a HEAT/COOL input which the operator may control through use of the slide switch 58, the third position being "OFF"; a temperature offset input which may have one of two states, depending upon the position selected for one of the thumb switches 56 and operates to control the temperature differential between "normal" and "set-back" to one of two values, preferably either 5° F. or 10° F.; and the output of a state selector circuit, 124, implemented within the microprocessor 64. The state selector output has one of two values depending upon whether the temperature should be in the normal mode or the set-back mode.

The output of the state selector 124 also goes to the two indicator lamps 98 and 100. One of the lamps is energized when the thermostat is in the normal temperature mode and the other lamp is energized when it is in the set-back mode.

Figure 4:
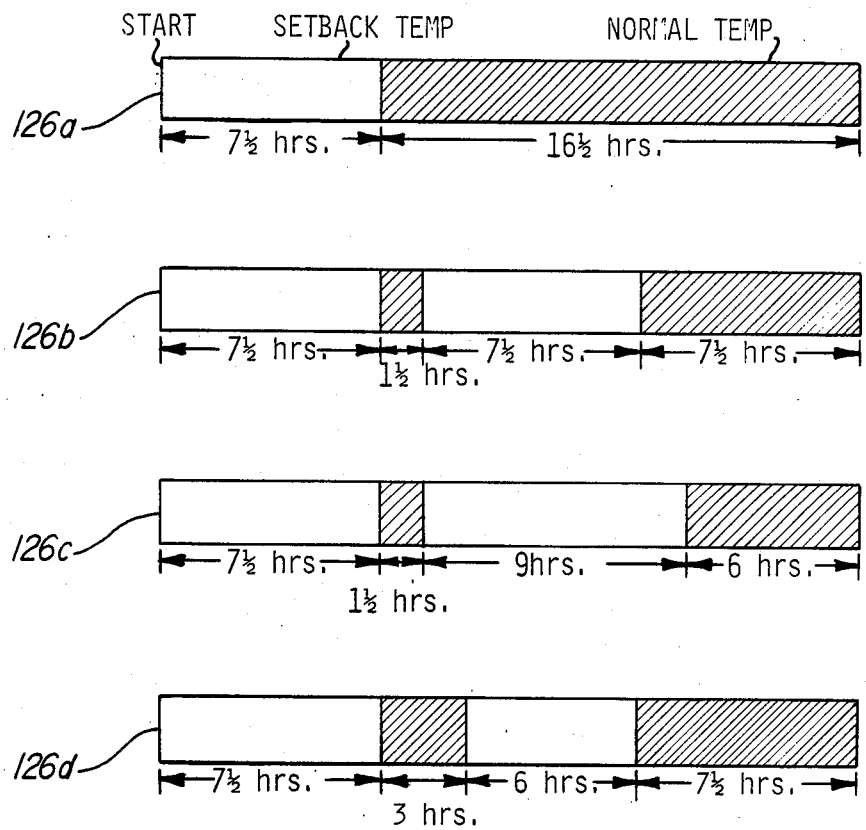
FIG. 4 is a graphic representation of the different daily set-back programs that may be implemented by the control.

Two of the thumb switches 56 are positioned by the operator to select one of four 24-hour set-back programs. The four programs are illustrated in FIG. 4. The program 126a, provides a single set-back period of 7½ hours, once a day. In order to achieve this program are the two thumb switches 56 which control the state selection are both placed in the "OFF" position. A second pattern, 126b provides two periods of 7½ hours set-back, spaced by 1½ hours from each other. This pattern is useful to turn down the temperature control when a home is unoccupied during those hours when children are normally at school but return in mid-afternoon. This program is achieved by turning the first of the switches 56 to the OFF position and the second of the switches to the ON position. The pattern 126c provides 7½ hours of set-back temperature followed by 1½ hours of normal temperature, followed by 9 hours of set-back temperature and then 6 hours of normal temperature. It is useful for people who work during the day, usually returning early in the evening. To achieve this pattern, the first of the switches 56 is turned to the ON position and the second switch is turned to the OFF position. A fourth program 126d provides 7½ hours of set-back followed by 3 hours normal temperature, then 6 hours of set-back temperature and finally 7½ hours of normal temperature. It is used by people who want to heat or air condition a home for 3 hours in the morning or those whose homes will not warm or cool sufficiently in 1½ hours. To achieve this pattern both the switches 56 which control state selection are turned to the ON position. Thus each daily cycle is divided into no more than four periods.

The state selector also receives an output from a clock 128 implemented by the microprocessor 64 which provides the state selector with a signal representative of the time of day. The clock 128 is synchronized by a sixty cycle power signal, derived from the power supply connections in the manner disclosed in U.S. Pat. No. 4,206,872.

The push-button 104 in the cover 86, which acts to press the push-button 60 formed on the printed circuit board 50, provides an input on line 130 and is used to initialize the clock 128 by a single depression at the time the user wishes to begin the first setback period beginning one of the four activity programs 126. This is done by a single depression of the push-button.

Each push of the START/CHANGE button changes the output state of the state selector, and inhibits the action of the clock upon the state selector for a 1½ to a 3 hour period. This allows the operator to make a temporary override to the operation of the thermostat.

Three rapid depressions of the push-button 104 provide a signal on line 132 to an exception random access memory 134, implemented within the microprocessor. The RAM 134 has an input from clock 128 representing the time with a day and the day of the week. It also has an input from the program selection switches 56. The RAM 134 has 7 three bit storage locations, each associated with a different day of the week. When it receives three closely spaced pulses from the push button 104 it stores a "period-delete" signal in the storage location associated with the present day having a value indicating which of the four periods within the selected program is to be deleted.

The ouput signal of the exception RAM 134 to the state selector circuit may have one of two values, one associated with a period which is not to be deleted and the other associated with a period for which a "period-delete" signal is stored. When the state selector circuit 124 receives a signal from the RAM 134 indicating that a "period-delete" signal is stored for that period, the state selector circuit inverts what would otherwise be its output. In order to eliminate these stored period deletions the operator interrupts the power to the circuit.

The programmed set-back thermostat of the present invention may be easily substituted for a conventional thermostat supported on a wall plate of the type illustrated, simply by removing the three screws which secure the non-programmable thermostat to the wall plate and substituting the present thermostat by use of the three screws 66, 68 and 70. The operator then pre-programs the thermostat by selecting a desired offset pattern and a desired offset temperature differential through use of the thumb switches 56 and selecting either the heat or the cool mode through positioning of the switch 58. The knob 80 and the cover 86 are then secured to the thermostat and at the time that the operator desires to initiate the selected set-back cycle the switch 104 is depressed.

The operator may adjust the room temperature at any time by adjustment of the knob 80. Since the set-back differential is unaffected by this adjustment, this simultaneously adjusts the normal and the set-back temperatures.

The provision of the rotationally adjusted thermostat setting for desired temperature eliminates the need for unfamiliar digital controls which often confuse the user.

The embodiments of the invention in which an exclusive property right is claimed are defined as follows:

1. An electronic thermostat for the control of a temperature modifying load, comprising:
    a component having an electrical characteristic which is a function of the ambient temperature;
    a manually adjustable control member having a continuously adjustable analog electrical characteristic, and corresponding temperature-related indicia, for entering a desired temperature set-point;
    electronic means operative to generate a digital signal having a value which is a function of the sum of the electrical characteristics of said component and said control member, and operative to use said digital signal to generate an output control signal for the temperature modifying load which modifies the ambient temperature to restore said digital signal to a constant value.

2. The thermostat of claim 1 wherein the manually adjustable control member is a variable resistor.

3. The thermostat of claim 1 wherein the component having an electrical characteristic which is a function of the ambient temperature is a temperature-sensitive resistor.

4. The thermostat of claim 1 wherein the manually adjustable control member and the component having an electrical characteristic which is a function of the ambient temperature are connected in series in an oscillator circuit having an output frequency which varies as a function of the sum of the electrical characteristics of the manually adjustable control member and the component.

5. The thermostat of claim 4 wherein said electronic means comprises a suitably programmed microprocessor.

6. The thermostat of claim 1 further including a clock and means controlled by the clock for modifying the constant value to which said digital signal is restored.

7. In an electronic programmable thermostat for use with a substantially planar wall plate adapted to be secured to a vertical wall of a room, having a predetermined minimum cross-dimension and having a plurality of threaded fasteners disposed in the central region thereof, the threaded fasteners adapted for electrical connection to at least one temperature modifying device, the improvement comprising:
    an electronic printed circuit board having a maximum cross-dimension no greater than the predetermined minimum cross-dimension of the wall plate including
    a plurality of holes disposed in the central region of said electronic printed circuit board in a pattern corresponding to the pattern of the threaded fasteners,
    a plurality of electronic components disposed on and interconnected via said electronic printed circuit board, said electronic components including a temperature sensitive device having an electrical characteristic which varies as a function of ambient temperature and a programmed microprocessor device connected to said temperature sensitive device for generating control signals for thermostatic control of the temperature modifying device, and
    a plurality of screw fasteners for mechanically securing said electronic printed circuit board to the threaded fasteners via said plurality of holes and for electrically connecting said control signals to the threaded fasteners, whereby said control signals are electrically connected to the temperature modifying device for control thereof via the threaded fasteners.

8. The thermostat of claim 7 wherein the wall plate is round and said electronic printed circuit board is round 9. The thermostat of claim 7 wherein the improvement further comprises: said electronic components including a potentiometer supported centrally on said electronic printed circuit board and having a shaft extending normally to said electronic printed circuit board in a direction away from that surface of said electronic printed circuit board adapted to be mounted in opposition to the wall plate and further including a circular knob affixed to said potentiometer shaft and extending substantially parallel to said electronic printed circuit board; and an annular cover adapted to be secured in non-rotating relationship to said electronic printed circuit board and to extend over the sides of said electronic printed circuit board and a portion of the surface from which said potentiometer shaft extends, with the perimeter of the annular aperture thereof disposed in proximity to the perimeter of said knob.

10. The thermostat of claim 9 wherein the improvement further comprises: said electronic components including means connected to said potentiometer for generating an alternating current signal having a frequency dependent upon the setting of said potentiometer, and counter operative to receive said alternating current signal and to generate a digital control signal having a value dependent upon the setting of said potentiometer.

11. The thermostat of claim 7 wherein the wall plate includes at least one control switch supported on the perimeter thereof electrically connected to the threaded fasteners, the improvement further comprising:

said electronic printed circuit board having substantially the same shape as the wall plate and supported by the threaded fasteners in a manner parallel to and spaced from the wall plate, whereby manual access to the at least one control switch is unimpeded by said electronic printed circuit board.

* * * * *